(12) United States Patent
Park

(10) Patent No.: US 8,492,938 B2
(45) Date of Patent: Jul. 23, 2013

(54) LINEAR VIBRATION DEVICE

(75) Inventor: Seok Jun Park, Gyunggi-do (KR)

(73) Assignee: Samsung Electro-Mechanics Co., Ltd., Gyunggi-do (KR)

(*) Notice: Subject to any disclaimer, the term of this patent is extended or adjusted under 35 U.S.C. 154(b) by 69 days.

(21) Appl. No.: 13/296,973

(22) Filed: Nov. 15, 2011

(65) Prior Publication Data

US 2013/0033127 A1 Feb. 7, 2013

(30) Foreign Application Priority Data

Aug. 3, 2011 (KR) .................. 10-2011-0077282

(51) Int. Cl.
*H02K 33/00* (2006.01)
(52) U.S. Cl.
USPC .................................................. 310/25
(58) Field of Classification Search
USPC ................................. 310/25, 30, 15, 36
See application file for complete search history.

(56) References Cited

U.S. PATENT DOCUMENTS

| 2005/0285454 | A1* | 12/2005 | Choi et al. | 310/14 |
| 2007/0216235 | A1* | 9/2007 | Lee | 310/36 |
| 2010/0277009 | A1* | 11/2010 | Jeon | 310/25 |
| 2011/0133578 | A1* | 6/2011 | Choi | 310/25 |
| 2012/0119595 | A1* | 5/2012 | Choi et al. | 310/25 |

OTHER PUBLICATIONS

Office Action dated Sep. 24, 2012 for related KR App. No. 10-2011-0077282 and its English summary.

* cited by examiner

*Primary Examiner* — Nguyen N Hanh
(74) *Attorney, Agent, or Firm* — Ladas & Parry LLP

(57) ABSTRACT

Disclosed herein is a linear vibration device. The linear vibration device includes a stator including magnets, a bracket, and a case having an inner space formed therein and coupled with the bracket; and a vibrator including coils facing the magnets, a weight body coupled with the coil, an FPC coupled with a top portion of the weight body, and an elastic member of which the one end is coupled with the case and the other end is coupled with the coil, the vibrator being accommodated in the case, wherein the magnets include a first magnet and a second magnet facing the first magnet, coupled with a top surface of the bracket, and including a magnetic fluid applied to a bottom portion and a side portion thereof.

10 Claims, 1 Drawing Sheet

LINEAR VIBRATION DEVICE

CROSS REFERENCE TO RELATED APPLICATION

This application claims the benefit of Korean Patent Application No. 10-2011-0077282, filed on Aug. 3, 2011, entitled "Linear Vibration Device", which is hereby incorporated by reference in its entirety into this application.

BACKGROUND OF THE INVENTION

1. Technical Field

The present invention relates to a linear vibration device.

2. Description of the Related Art

A general linear vibration device is a part that converts electrical energy into mechanical vibration using a principle of generating electromagnetic force. The general linear vibration device is mounted in a mobile communication terminal, a portable terminal, or the like, so as to be used for notifying mute termination.

In addition, with the sudden expansion of radio communication and mobile phone markets, a demand for a multi-functional mobile communication terminal has been increased. The performance and technology of the linear vibration device has been also developed day by day so as to surprisingly improve disadvantages and quality of the existing products under the conditions that miniaturization and high quality of parts of the mobile communication terminal are demanded.

Further, a release of a mobile phone having a large LCD screen has been suddenly increased in recent years. To this end, a touch screen type that generates vibrations at the time of touch is adopted. Today, a demand of the touch screen type has been increased.

Meanwhile, performance specifically required in vibrations according to the touch of the touch screen is as follows. First, with the increase in use frequency as compared with the vibration generation at the time of receiving a call, operation lifespan needs to be increased. Second, a user can feel vibrations at the time of touch by increasing a response speed of vibrations according to a speed touching the screen.

A linear vibration device, which is a linear vibration device satisfying the above-mentioned characteristics, generates vibrations by being vibrated by electromagnetic force, while having a resonance frequency determined by a spring and a vibrator to be connected to the spring. Further, the electromagnetic force is generated by interaction with current having a predetermined frequency, which is applied to a magnet of the vibrator and a coil of a stator.

The linear vibration device configured as described above generates touch noise by colliding the vibrator with a case or a bracket while the vibrator moves vertically. To prevent the touch noise, in the linear vibration device, a ring-shaped band is made by applying MF or a damping material (rubber, poron, or the like) has been used.

However, in the case of using the MF, since the MF is made of liquid, the MF is sprayed to the periphery at the time of excessive impact and is out of an original position to weaken the damping function, thereby causing the noise at the time of the vibration operation. The damping material such as rubber, poron, or the like, occupies a predetermined volume and thus, is difficult to be disposed within a restricted space and has a degraded freedom in design.

SUMMARY OF THE INVENTION

The present invention has been made in an effort to provide a linear vibration device capable of improving noise and reliability due to friction between parts.

According to a preferred embodiment of the present invention, there is provided a linear vibration device, including: a stator including magnets, a bracket, and a case having an inner space formed therein and coupled with the bracket; and a vibrator including coils facing the magnets, a weight body coupled with the coil, an FPC coupled with a top portion of the weight body, and an elastic member of which the one end is coupled with the case and the other end is coupled with the coil, the vibrator being accommodated in the case, wherein the magnets include a first magnet coupled with a bottom surface of the case, disposed between the coils of the vibrator, including a plate mounted on a top portion thereof, and including a magnetic fluid applied to a top portion and a side portion of the plate and a second magnet facing the first magnet, coupled with a top surface of the bracket, and including a magnetic fluid applied to a bottom portion and a side portion thereof.

The opposing surfaces of the first magnet and the second magnet may have the same polarity.

The vibrator may further include a yoke coupled with a bottom portion of the weight body.

The weight body may be provided with a hollow portion which accommodates a cylindrical yoke and the coil.

The elastic member and the coil may be provided with the hollow portion so as to be linearly moved in a state in which the stator is embedded in the hollow portion.

According to another preferred embodiment of the present invention, there is provided a linear vibration device, including: a stator including magnets, a bracket, and a case having an inner space formed therein and coupled with the bracket; and a vibrator including coils facing the magnets, a weight body coupled with the coil, an FPC coupled with a top portion of the weight body, and an elastic member of which the one end is coupled with the case and the other end is coupled with the coil, the vibrator being accommodated in the case, wherein the magnets include first magnets each provided on a bottom surface and a the top surface of the case, connected to a plate by a magnetic fluid, and disposed between the coils of the vibrator and second magnets coupled with a top surface of the bracket so as to face the weight body and including a magnetic fluid applied to a bottom portion and a side portion thereof.

The second magnet may be disposed at both sides so as to correspond to a position of the weight body.

The vibrator may further include a yoke coupled with a bottom portion of the weight body.

The weight body may be provided with a hollow portion which accommodates a cylindrical yoke and the coil.

The elastic member and the coil may be provided with the hollow portion so as to be linearly moved in a state in which the stator is embedded in the hollow portion.

DESCRIPTION OF THE PREFERRED EMBODIMENTS

Figure 1:
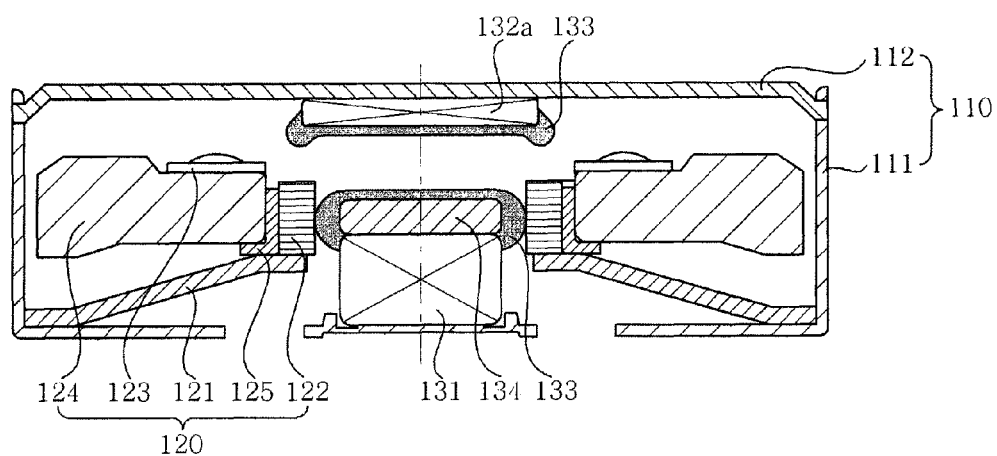
FIG. 1 is a cross-sectional view of an entire linear vibration device 100 according to a first preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 2:
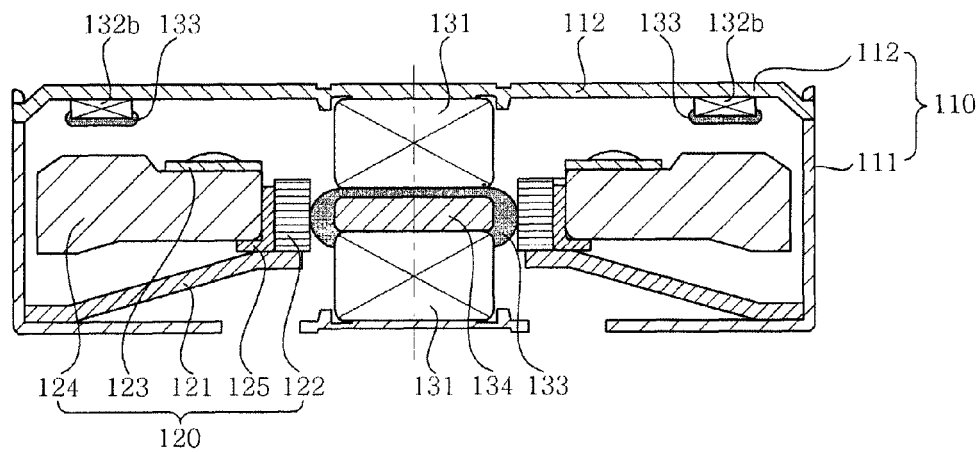
FIG. 2 is a cross-sectional view of an entire linear vibration device 100 according to a second preferred embodiment of the present invention.

FIG. 1 is a cross-sectional view of an entire linear vibration device 100 according to a first preferred embodiment of the present invention and FIG. 2 is a cross-sectional view of an entire linear vibration device 100 according to a second preferred embodiment of the present invention.

As shown in FIG. 1, a linear vibration device 100 according to the preferred embodiment of the present invention includes a stator 110 having a case 111 and a bracket 112 and a vibrator 120 having an elastic member 121, a coil 122, an FPC 123, a weight body 124, and a yoke 125, wherein a bottom portion of the case 111 is provided with a first magnet 131 and a bracket 112 is provided with a second magnet 132.

The case 111, which partitions an inner space of the linear vibration device 100, protects interior parts from the outside. A material of the case 111 may be an iron-based material and the elastic member 131 is fixed to a corner portion under the case 111.

The bracket 112 is disposed on a top portion of the case 111 to protect products from the outside, together with the case 111.

The case 111 and the bracket 112 form the stator 110 of the linear vibration device 100.

The elastic member 121 is fixed to corner portions above and under the case 111 to support vertical vibration of the vibrator 120. As the elastic member 121, a plate spring is generally used.

The coil 122 is mounted on a top portion of the elastic member 121 so as to be vertically vibrated and is applied with electromagnetic force, together with the magnet facing the coil, thereby generating vibration force.

The FPC 123, which is a printed circuit board having elasticity, is mounted on a top portion of the weight body 124 and is applied with electrical signals.

The weight body 124 is mounted on a top portion of the yoke 125 so as to be vertically vibrated. Meanwhile, a weight of the weight body is associated with the vibration force.

The yoke 125 is mounted on the top portion of the elastic member 121 so as to support the weight body 124, thereby supporting the vertical vibration of the weight body 124.

The elastic member 121, the coil 122, the FPC 123, the weight body 124, and the yoke 125 form the vibrator 120 of the linear vibration device 100.

In this configuration, the weight body 124 is provided with a hollow portion that accommodates the cylindrical yoke 125 and the coil 122.

In addition, the elastic member 121 and the coil 122 are provided with the hollow portion so as to be linearly moved in the state in which the stator 110 is embedded therein.

A bottom portion of the case 111 is provided with the first magnet 131, the bracket 112 is provided with a second magnet 132a, and the top portion of the first magnet 131 is provided with a plate 134, and is applied with a magnetic fluid 133 so as to surround the plate 134.

In addition, the magnetic fluid 133 is applied to a bottom portion and a side portion of the second magnet 132 mounted on the bracket 112. The magnetic fluid 133, which is a liquid having magnetism, prevents a friction with other parts.

That is, the linear vibration device 100 according to the first preferred embodiment of the present invention includes the stator 110 having the magnets 131 and 132, the bracket 112 and the case 111 having the inner space formed therein and coupled with the bracket 112 and the vibrator 120 having the coils 122 facing the magnets 131 and 132, the weight body 124 coupled with the coil 122, the FPC 123 coupled with the top portion of the weight body 124, and the elastic member 121 of which one end is coupled with the case 111 and the other end is coupled with the coil 122, wherein the vibrator 120 is accommodated in the case 111.

In this configuration, the magnets 131 and 132 include the first magnet 131 coupled with the bottom surface of the case 111, disposed between the coils 122 of the vibrator 120, including the plate 134 mounted on the top portion thereof, and including the magnetic fluid 133 applied to the top portion and the side portion of the plate 134 to prevent the friction with other parts and the second magnet 132a facing the first magnet 131, coupled with the top surface of the bracket 112, and including the magnetic fluid 133 applied to the bottom portions and the side portions thereof.

In this configuration, the opposing surfaces of the first magnet 131 and the second magnet 132a may have the same polarity so as to increase magnetic efficiency.

FIG. 2 is a cross-sectional view of an entire linear vibration device 100 according to a second preferred embodiment of the present invention.

The structure of the second preferred embodiment of the present invention is similar to that of the first preferred embodiment of the present invention, but the magnetic fluid 133 is applied to the top portion of the plate 134 mounted on the top portion of the first magnet 131 and the top portion of the magnetic fluid 133 contacts the first magnet 131 mounted on the top surface of the bracket 112 so as to contact the magnetic fluid 133.

The top surface of the bracket 112 is provided with a second magnet 132b in both directions so as to correspond to a position of the weight body 124.

The bottom portion of the second magnet 132b is applied with the magnetic fluid 133 to prevent the second magnet 132b from being fractionized with the weight body 124 when the weight body 124 is vertically vibrated.

That is, the linear vibration device 100 according to the second preferred embodiment of the present invention includes the stator 110 having the magnets 131 and 132, the bracket 112 and the case 111 having the inner space formed therein and coupled with the bracket 112, the vibrator having the coil 122 facing the magnets 131 and 132, the weight body 124 coupled with the coil 122, the FPC 123 coupled with the top portion of the weight body 124, and the elastic member 121 of which one end is coupled with the case 111 and the other end is coupled with the coil 122, wherein the vibrator is accommodated in the case 111.

In this case, the magnets 131 and 132 include the first magnets 131 each provided on the bottom surface and the top surface of the case 111, connected to the plate 134 by the magnetic fluid 133, and disposed between the coils 122 of the vibrator 124 and the second magnets 132b coupled with the top surface of the bracket 112 so as to face the weight body 124 and including the magnetic fluid 133 applied to the bottom portions and the side portion thereof.

In addition, the second magnet 132b is disposed at both sides so as to correspond to the position of the weight body 124.

According to the preferred embodiment of the present invention having the above-mentioned structure, the linear vibration device 100 mounts at least one magnet 132 on the stator 110 and applies the magnetic fluid 133 thereto so as to prevent the friction and abrasion with the stator 110 at the time of driving the vibrator 120.

As a result, the preferred embodiment of the present invention can prevent the problem of the change in frequency and the reduction in vibration according to the interference degree due to the deviations in the dimension of the elastic member and the damper having the structure according to the prior art and the fine mounting position while minimizing the friction and abrasion of the stator 110 and the vibrator 120 and reduce the noise generated at the time of damping.

Although the preferred embodiments of the present invention have been disclosed for illustrative purposes, they are for specifically explaining the present invention and thus the linear vibration device according to the present invention is not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A linear vibration device, comprising:
a stator including magnets, a bracket, and a case having an inner space formed therein and coupled with the bracket; and
a vibrator including coils facing the magnets, a weight body coupled with the coil, an FPC coupled with a top portion of the weight body, and an elastic member of which the one end is coupled with the case and the other end is coupled with the coil, the vibrator being accommodated in the case,
wherein the magnets include a first magnet coupled with a bottom surface of the case, disposed between the coils of the vibrator, including a plate mounted on a top portion thereof, and including a magnetic fluid applied to a top portion and a side portion of the plate and a second magnet facing the first magnet, coupled with a top surface of the bracket, and including a magnetic fluid applied to a bottom portion and a side portion thereof.

2. The linear vibration device as set forth in claim 1, wherein the opposing surfaces of the first magnet and the second magnet have the same polarity.

3. The linear vibration device as set forth in claim 1, wherein the vibrator further includes a yoke coupled with a bottom portion of the weight body.

4. The linear vibration device as set forth in claim 1, wherein the weight body is provided with a hollow portion which accommodates a cylindrical yoke and the coil.

5. The linear vibration device as set forth in claim 1, wherein the elastic member and the coil are provided with the hollow portion so as to be linearly moved in a state in which the stator is embedded in the hollow portion.

6. A linear vibration device, comprising:
a stator including magnets, a bracket, and a case having an inner space formed therein and coupled with the bracket; and
a vibrator including coils facing the magnets, a weight body coupled with the coil, an FPC coupled with a top portion of the weight body, and an elastic member of which the one end is coupled with the case and the other end is coupled with the coil, the vibrator being accommodated in the case,
wherein the magnets include first magnets each provided on a bottom surface and a the top surface of the case, connected to a plate by a magnetic fluid, and disposed between the coils of the vibrator and second magnets coupled with a top surface of the bracket so as to face the weight body and including a magnetic fluid applied to a bottom portion and a side portion thereof.

7. The linear vibration device as set forth in claim 6, wherein the second magnet is disposed at both sides so as to correspond to a position of the weight body.

8. The linear vibration device as set forth in claim 6, wherein the vibrator further includes a yoke coupled with a bottom portion of the weight body.

9. The linear vibration device as set forth in claim 6, wherein the weight body is provided with a hollow portion which accommodates a cylindrical yoke and the coil.

10. The linear vibration device as set forth in claim 6, wherein the elastic member and the coil are provided with the hollow portion so as to be linearly moved in a state in which the stator is embedded in the hollow portion.

* * * * *